United States Patent [19]

Baba et al.

[11] Patent Number: 4,911,413
[45] Date of Patent: Mar. 27, 1990

[54] STRUCTURE FOR FITTING A VALVE SEAT SUPPORT RING IN A VALVE PORT

[75] Inventors: Akihisa Baba; Takashi Yuki, both of Urawa, Japan

[73] Assignee: Kitamura Valve Mfg. Co., Ltd., Tokyo, Japan

[21] Appl. No.: 383,911

[22] Filed: Jul. 20, 1989

[30] Foreign Application Priority Data

May 23, 1989 [JP] Japan .................. 1-58695[U]

[51] Int. Cl.$^4$ .................................. F16K 5/06
[52] U.S. Cl. ........................... 251/360; 251/181; 251/315; 251/316
[58] Field of Search ............... 251/181, 315, 316, 360

[56] References Cited

U.S. PATENT DOCUMENTS 3,458,171  7/1969  Urban .
3,598,363  8/1971  Shaw .
4,336,919  6/1982  Hall .
4,342,444  8/1982  Sonderman .

FOREIGN PATENT DOCUMENTS 663993  1/1952  United Kingdom ............... 251/360

OTHER PUBLICATIONS

Fisher Control Catalog, Jul. 1983.
Neles R1 Catalog, Aug. 1986.
Koso Control Valve-Flowmax Catalog.

Primary Examiner—Gerald A. Michalsky

[57] ABSTRACT

In a valve in which a valve port is opened and closed by a spherical valve disc, a valve seat is pressed and supported by a support ring. A snap ring which engages with an annular groove around the support ring is inserted together with the support ring into the port. A screw is screwed into an axial threaded bore of the support ring to expand diameter of the snap ring, which results in engaging the snap ring with an annular groove of the port. Thus, the support ring is fitted in the port.

1 Claim, 3 Drawing Sheets

STRUCTURE FOR FITTING A VALVE SEAT SUPPORT RING IN A VALVE PORT

BACKGROUND OF THE INVENTION

The present invention relates to a structure for fitting a valve seat support ring in a valve port of a valve where the valve port is opened and closed by turning a semi-spherical valve disc.

FIG. 4 illustrates a known valve, in which the numerals 1, 2, 3 and 4 indicate a valve housing, a valve port, a valve stem and a semi-spherical valve disc respectively. Into the left port 2 in FIG. 4, a valve seat holder 5, an annular valve seat 6 and an annular compression spring 7 are inserted in order. By screwing a valve seat support ring 8 into the port 2, the valve seat 6 is forced against the valve disc 4. The numeral 9 indicates a thread, and the numeral 10 indicates a recess on which a tool for screwing the support ring 8 into the port 2 is put.

FIGS. 5 and 6 illustrate another example of a known support ring fitting structure in which the same numerals identify the same members as those in the above example. In this structure, instead of the above thread 9 and recess 10, there are provided a groove 12 and a hole 13 opposite to each other on the inner surface of the port 2 and outer surface of the support ring 11 which is fitted in the port 2 in axially slidable state. Also, on the side end of the support ring 11, there are a plurality of threaded bores 12 axially arranged and communicating with the hole 13.

A ball 15 is inserted into the hole 13, and the support ring 11 is inserted into the port 2. Then, a screw 16 is screwed into each bore 14, which makes the ball 15 pushed out of the hole 13 to insert it into the groove 12, whereby the ring 11 is fitted in the port 2.

However, in the valve as shown in FIG. 4, for long use of the valve, the threaded portion is subject to corrosion and to deposition of substance in fluid, which causes difficulty in removal of the support ring. Further, manufacturing is troublesome and costly, and it requires special tools to assemble and disassemble it.

The ball-having structure in FIGS. 5 and 6 is easy in manufacturing, assembling and disassembling, but the ball is likely to be lost when disassembled. Also, the valve has to be made of special material depending upon use, but it is difficult to obtain a ball made of such material.

SUMMARY OF THE INVENTION

According to the present invention, there is provided a structure for fitting a valve seat support ring in a valve port of a valve where the valve port is opened and closed by turning a valve disc, comprising a first annular groove which is provided on the inner surface of the valve port, a second annular groove which is provided on the outer surface of the support ring, facing the first annular groove, a snap ring which engages with the second annular groove on the support ring, a threaded bore which is provided axially on the support ring to communicate with the second annular groove, and a screw which is screwed into the threaded bore to expand diameter of the snap ring, which causes the snap ring to be engaged with the first annular groove, whereby the support ring is fitted in the valve port.

According to the present invention, the support ring is fitted in the valve port by screwing the screw in the support ring by making the snap ring occupied in the two grooves facing each other. The screw is turned back until its end leaves the groove formed in the support ring within the threaded bore to shrink diameter of the snap ring, which gets out of the groove formed on the port, so that the support ring is easily removed from the valve port. The snap ring which engages with the groove of the support ring is unlikely to be missed.

BRIEF DESCRIPTION OF DRAWINGS

The features will become more apparent from the following description of embodiment with reference to the accompanying drawings in which.

PREFERRED EMBODIMENT OF THE INVENTION

Figure 1:
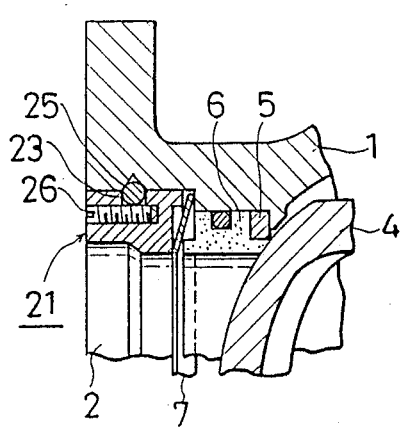
FIG. 1 is a vertical sectional view of a valve seat support ring fitting structure according to the present invention.
Figure 2:
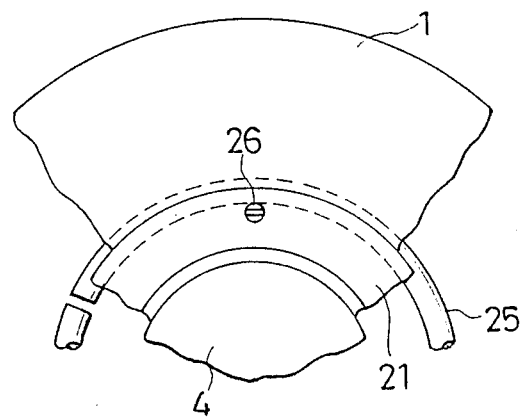
FIG. 2 is a side view of the same.
Figure 3:
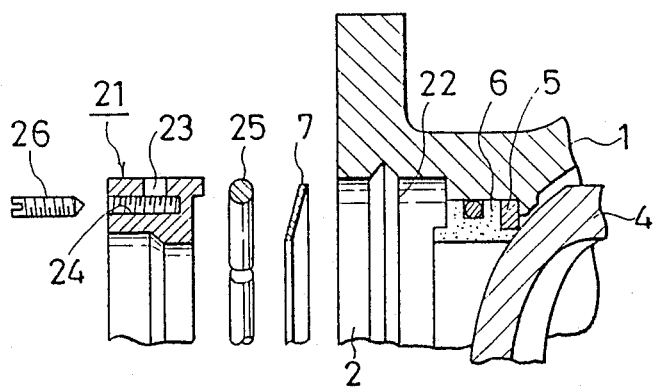
FIG. 3 illustrates each portion of the structure in FIG. 1 separately.
Figure 4:
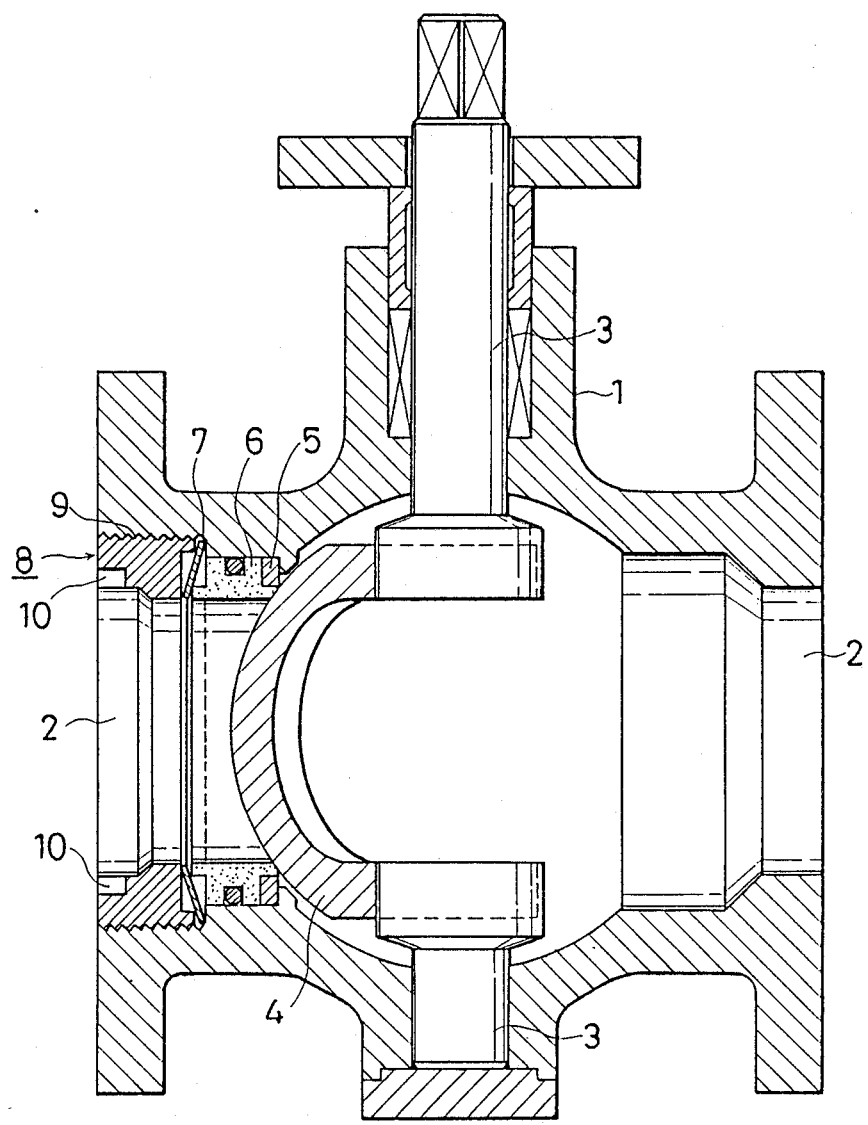
FIG. 4 is a vertical sectional front view of a known valve.
Figure 5:
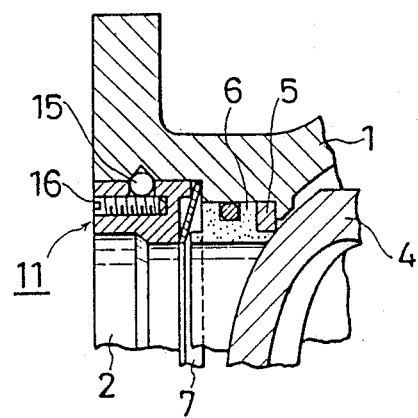
FIG. 5 is a vertical sectional view of another structure in a known valve.
Figure 6:
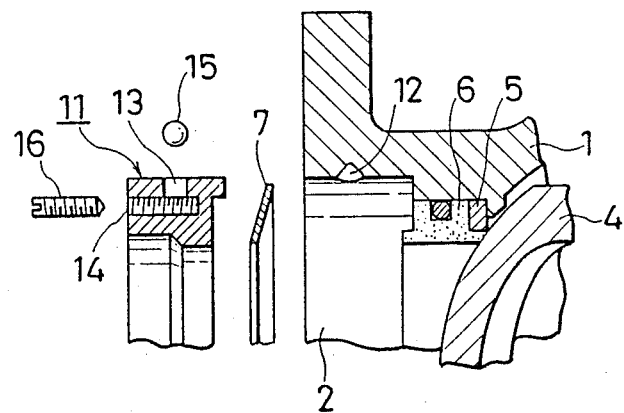
FIG. 6 illustrates each portion of FIG. 5 separately.

FIGS. 1 to 3 illustrate one embodiment of the present invention in which the same numerals identify the same members in the known structure as described above.

A support ring 21 in the present invention is slidably inserted into a port 2, similar to the ring 11 as above. There are provided an annular groove 22 and an annular groove 23 opposite to each other on the inner surface of the port 2 and the outer surface of the support ring 21 respectively, instead of the groove 12 and the groove 23 as illustrated in the prior art. There are provided a plurality of threaded bores 24 axially on the side end of the support ring 21, communicating with the groove 23.

Into the annular groove 23 of the support ring 21, an expanding snap ring 25 is fitted by force, so that the ring 21 is inserted into the port 2. A screw 26 is screwed into the bore 24, and the snap ring 25 increases in diameter due to the end of the screw 26 to engage with the groove 22, whereby the ring 21 is fitted in the port 2.

The screw 26 is turned back until its end leaves the groove 23, so that the snap ring 25 decreases in diameter due to elasticity and gets out of the groove 22. Thus, the support ring 21 can be removed together with the screw 26 and the snap ring 21 from the port 2.

According to the present invention, a support ring is inserted together with a snap ring into a port by turning a screw, while, by reverse operation, the support ring could be removed together with the screw and the snap ring from the port. Therefore, attachment is easy and there is no likelihood of losing small parts. It is also possible for a snap ring to be made of desired material depending upon its use, different from material for a ball employed in the prior art.

Further, being different from a known implement, it is not necessary for a port and a support ring to be threaded in a large diameter, which results in easy, low cost manufacturing and preventing threads from adhering by corrosion so as to avoid difficulty in attachment of a support ring. It does not allow a special tool to be required for attachment of the support ring, either.

What is claimed is:

1. A structure for fitting a valve seat support ring in a valve port of a valve where the valve port is opened and closed by turning a valve disc, comprising:
   a first annular groove which is provided on the inner surface of the valve port;
   a second annular groove which is provided on the outer surface of the support ring, facing the first annular groove;
   a snap ring which engages with the the second annular groove on the support ring;
   a threaded bore which is provided axially on the support ring to communicate with the second annular groove; and
   a screw which is screwed into the threaded bore to expand diameter of the snap ring, which causes the snap ring to be engaged with the first annular groove, whereby the support ring is fitted in the valve port.

* * * * *